Nov. 17, 1953
R. E. CHURCH
2,659,445
STEERING MECHANISM FOR ROTARY MOWERS
Filed March 29, 1950
4 Sheets-Sheet 4
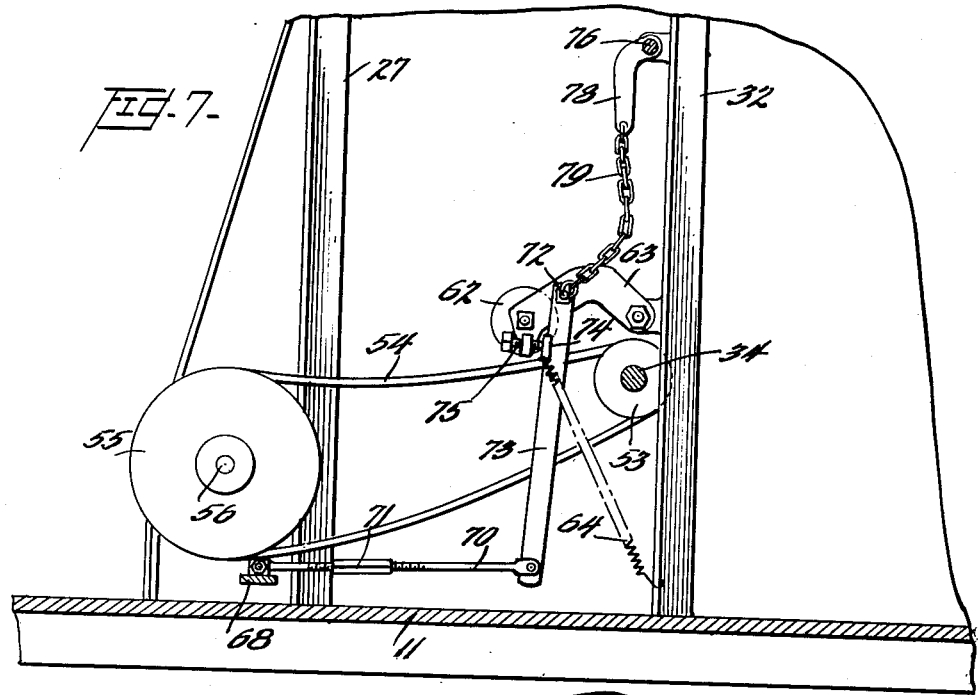
INVENTOR
Robert E. Church,
BY Cushman, Darby & Cushman
ATTORNEY Patented Nov. 17, 1953

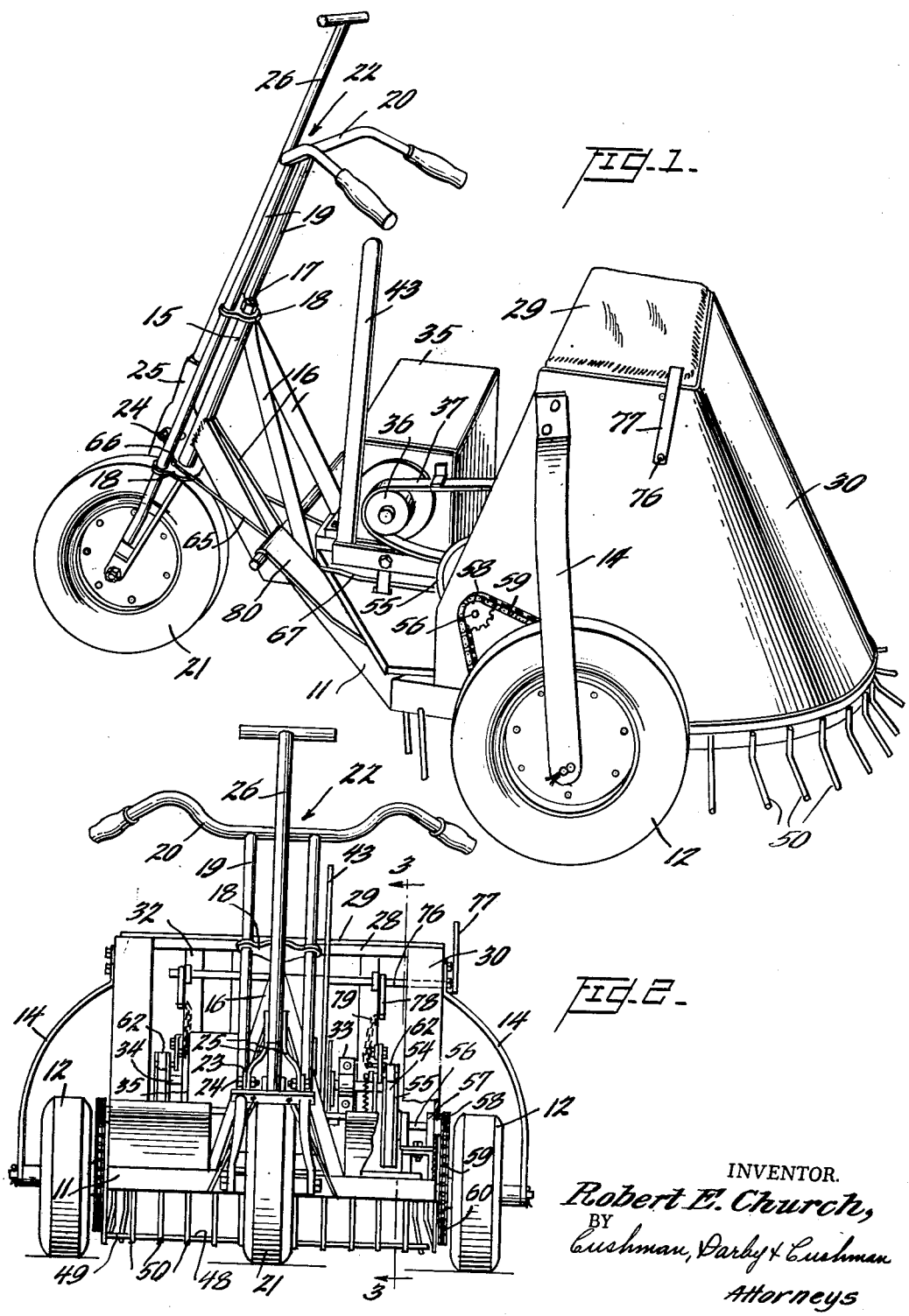

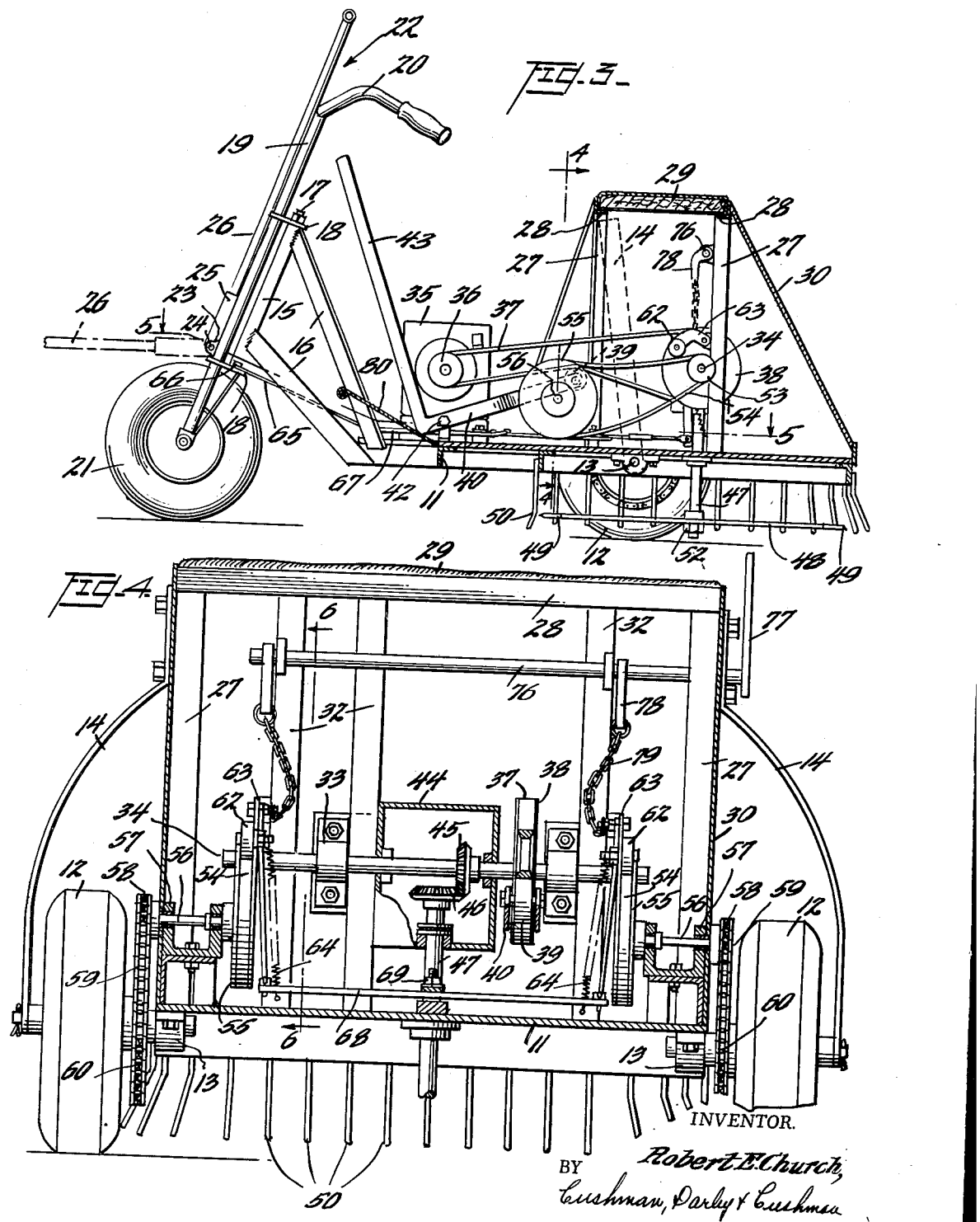

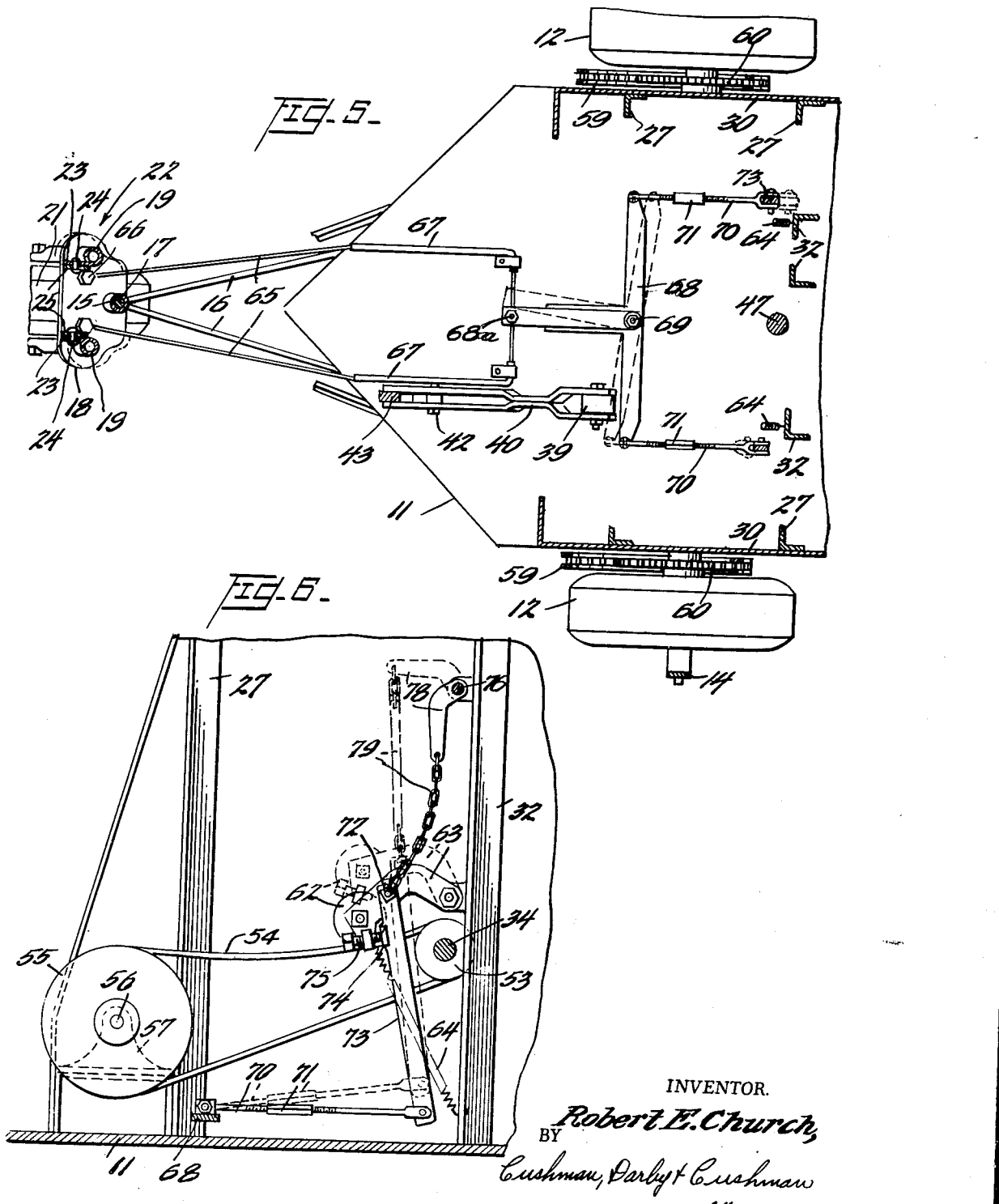

2,659,445

UNITED STATES PATENT OFFICE 2,659,445

STEERING MECHANISM FOR ROTARY MOWERS

Robert E. Church, Elkin, N. C.

Application March 29, 1950, Serial No. 152,528

3 Claims. (Cl. 180—6.32)

This invention relates to drive systems, particularly to a vehicle drive system especially adapted for self-propelled mowers of the rotary type, and has for an object the provision of a vehicle drive system of outstanding simplicity and flexibility.

A primary object of the invention is to provide a vehicle drive system wherein power distribution to individual driving wheels is controlled by movement of a steering element, and power is distributed in accordance not only with the direction of movement of the steering element, but also with the degree of movement thereof.

A further object is the provision of a vehicle drive system including no transmission or differential in the conventional sense, easily adjusted and maintained with a minimum of skill, adapted for low cost manufacture and operation, and of light weight.

Another object is the provision of a highly maneuverable, self-propelled rotary mower, having a very short radius of turn substantially equal to its wheel base, and capable of turning sharply without reducing speed.

Yet another object is the provision in a self-propelled vehicle wherein power distribution to individual driving wheels is controlled by movement of a steering element, of means for the effective disconnection of both driving wheels, to permit manual movement of the vehicle in any desired direction.

Further objects will be in part obvious and in part pointed out hereinafter.

The invention and the novel features thereof may best be made clear from the following description and the accompanying drawings, in which:

Figure 1 is a perspective view of an exemplary embodiment of the present invention, incorporated in a rotary mower of the tricycle type;

Figure 2 is a front elevation of the mower of Figure 1, partly broken away to show one of the individual driving wheel drives;

Figure 3 is a sectional elevational view of the device taken substantially on the line 3—3 of Figure 2;

Figure 4 is a sectional elevational view taken on the line 4—4 of Figure 3;

Figure 5 is a plan sectional view taken along the line 5—5 of Figure 3, showing primary elements of the vehicle drive system;

Figure 6 is a sectional elevational view taken along the line 6—6 of Figure 4, showing the driving wheel drive elements in normal, straight ahead relationship;

Figure 7 is a view corresponding to Figure 6, but showing the various parts in right hand turning relationship, and Figure 8 is a view corresponding to Figure 6, showing the parts in left hand turning relationship.

Referring to the drawings, particularly Figures 1, 2, 3 and 4, the exemplary embodiment of the invention includes a frame 11, and a transversely spaced pair of driving wheels 12 suitably mounted thereon, as by means of bearings 13 and the dual-purpose guard arms 14. At the forward end of the device, a tubular housing 15 is supported generally vertically relative to the frame by suitable braces 16, preferably along an axis inclined rearwardly somewhat from the vertical, as shown.

Rotatably mounted within housing 15 and substantially enclosed thereby is a steering column 17, to respective ends of which are secured fork plates 18, which retain the fork elements 19, joined at their upper ends to handle bar 20 and rotatably supporting therebetween at their lower ends the guiding wheel 21. The rotating steering structure shown constitutes a unitary steering post indicated generally as 22, the particular structure of which is not critical. Lugs 23 extend from the forward sides of fork elements 19 and pivotally support, as by bolts 24, the branched lower end 25 of tow bar 26. Adjacent the rear end of frame 11, corner standards 27 extend upwardly therefrom, being joined at their upper ends by beams 28 to form a rigid box-like structure. Beams 28 support thereabove an operator's seat 29, hingedly or removably affixed thereto for ready access to the mechanism therebelow, which is substantially enclosed by the fitted casing 30. Intermediate the rear pair of corner standards 27, a plurality of intermediate standards 32 extend from frame 11 to the rearmost beam 28 and provide suitable support for bearings 33, upon which the power shaft 34 is rotatably mounted.

Substantially centrally of the device, a source of motive power such as gasoline engine 35 is mounted on the frame, and power is conveyed from the take-off pulley 36 thereof to the power shaft by means of belt 37 and pulley 38 fixed to said shaft. Belt 37 may be a conventional V belt or plurality thereof, and is of such length as to bear lightly on take-off pulley 36 and not be engaged thereby, unless appreciably tightened by externally applied force, in the well known manner. Serving as a clutch in the transmission of power from engine to power shaft is the idler 39, mounted at the outer end of arm 40, which is pivotally mounted on the frame by pivot 42. An operating handle 43 extends generally upwardly and forwardly from arm 40 adjacent its pivot 42, whereby the idler 39 may be readily displaced into and out of contact with belt 37.

The central portion of power shaft 34 is enclosed by a gear box 44, within which suitable gearing mechanism, such as bevel gears 45 and 46, is provided to transmit rotary motion of the power shaft to the vertically disposed drive shaft 47, which extends through the vehicle frame and carries adjacent its lower end the cutter bar 48, to each end of which is fixed a knife 49. The cutter-knife assembly is disposed for rotation in a horizontal plane, and its path of movement is enclosed by suitable guard elements 50. For varying the height of cut as desired, the cutter bar 48 is vertically adjustable on the lower end of drive shaft 47. This may be effected, for example, by a threaded connection therebetween and provision of a lock nut 52.

From the outer ends of power shaft 34, the driving wheels 12 are driven through individual drive systems. Rotary movement is transmitted from each end of the power shaft through a pulley 53 and belt 54 to a relatively large pulley 55, fixed to the inner end of a stub shaft 56 rotatably supported by a generally U-shaped bracket 57 mounted on the frame. The outer end of each stub shaft carries a sprocket 58, connected by a chain 59 to a suitably sized sprocket 60 engaged to the adjacent driving wheel.

As in the case of the belt 37, the belts 54 fit loosely upon their pulleys, so that the pulleys may turn freely relative thereto in the absence of any belt tightening pressure. Controlling the power transmission of each belt is an idler 62, mounted for vertical swinging movement relative to the adjacent belt at the outer end of an idler arm 63, which may be pivotally engaged, conveniently, to one of the standards 32. A spring 64 extends from the frame or one of the frame standards to each idler 62, or to the outer end of each idler arm, whereby the idler is constantly urged downwardly into pressure contact with the exterior surface of the associated belt.

The idlers 62 are employed to effect the novel drive system of the present invention. Respective ends of a cable 65 are fixed to transversely spaced points associated with steering post 22, for example by means of bolts 66 to the lower fork plate 18, the cable extending rearwardly therefrom and being guidably supported and enclosed in its path on either side of engine 35 by means of rigid conduits 67, the central portion of the cable extending transversely above the machine frame between the rear, inwardly turned ends of conduits 67. Rearwardly of the central portion of the cable, a T-shaped control member 68 is mounted for pivoting movement in a horizontal plane on the pivot 69 extending through its intersection. The foot of the T, as shown in Figure 5, is fixed to the central portion of cable 65, as by clamp bolt 68a. As best shown in Figure 6, a rigid link 70 is fixed to each end of the crosspiece of the T control member, as by a ball and socket joint, and extends rearwardly therefrom, each link including a turnbuckle 71 for adjustment of the length thereof. Pivotally fixed to the rear end of each link and extending therefrom to an intermediate pivot 72 on the idler arm 63 thereabove is a lever 73. The forward edge of each lever 73 carries a suitably positioned stop 74, adapted to engage an oppositely disposed and preferably adjustable stop 75 incorporated into the outer end of the lever arm.

Above power shaft 34, a rock shaft 76 is suitably supported by the framework of the device, for example by standards 32, the rock shaft extending outwardly at one end through casing 30, and being provided at its outer end with a handle 77. A pair of arms 78 are fixed to the rock shaft and extend radially therefrom, and to the end of each arm is connected a chain 79, which is also connected to the lever arm therebelow, conveniently at the pivot point 72.

The operation of the device will now be described in detail. By moving operating handle 43 rearwardly, idler 39 may be pivoted out of engagement with belt 37, and the engine 35 started and warmed up without load. The operator may be seated upon seat 29, and foot rests 80 may be provided extending between the frame and braces 16 for his comfort. To commence operation, operating handle 43 is moved forwardly, whereby idler 39 tightens belt 37 and thereby engages pulley 38 and power shaft 34 to the engine 35. If desired, suitable provision may be made for retaining handle 43 in forward position. As is evident in Figure 4, rotation of power shaft 34 effects corresponding rotation of the drive shaft 47 at comparable speed, whereby the cutter bar 48 and the knives 49 carried thereby are rotated. The cutter-knife assembly, rotating in a horizontal plane at high speed, functions as a highly efficient mower, as is well known, and when moved over the ground is equally effective to cut grass, tall weeds, or low-lying flat leaved plants. As is usual in rotary mowers of this type, foliage encountered thereby is finely shredded and scattered, and may be left on the ground as mulch, no raking being necessary.

Simultaneously with drive shaft 47, both pulleys 53 are rotated by power shaft 34. With guiding wheel 21 in straight ahead position, as shown in solid lines in Figure 5, the foot of T-shaped control member 68 is longitudinally aligned with the center line of the machine, and the crosspiece arms are transversely aligned relative thereto. Links 70 being properly adjusted, the levers 73 and idler arms 63 will occupy identical positions relative to belts 54, whereby each belt will be equally tensioned and an equal amount of power conveyed to each pulley 55, and thereby to each driving wheel 12.

The drive system is preferably adjusted so that with guiding wheel 21 in straight ahead position the idlers 62 will tension belts 54 equally, whereby equal power will be transmitted from the power shaft to pulleys 55. The preferred adjustment permits some slippage of pulleys 53 relative to the belts, so that both driving wheels 12 are driven at intermediate speeds. The position of idler arms 63 is determined, as will be apparent, by the stops 74 carried by levers 73, which engage the adjustable stops 75 affixed to the outer ends of the idler arms and oppose the tendency of springs 64 to pull the idler arms downwardly. This balanced, straight ahead position of the drive system is illustrated in solid lines in Figures 5 and 6.

Movement of handle bar 20 by the operator to turn the vehicle to the left effects rotation of steering post 22 to a position as illustrated in dotted lines in Figure 5, and the rotation of the steering post effects resultant longitudinal movement of cable 65 in its substantially fixed path. The movement of the central portion of cable 65 causes control member 68 to rotate about its pivot to the position similarly illustrated in dotted lines in Figure 5, whereby the right hand link 70 is displaced rearwardly and the left hand link 70 correspondingly displaced forwardly. Upon movement of the handle bar by the operator to the right, opposite movement of cable 65, control member 68 and links 70 is caused.

Figure 7 illustrates the position of the elements of the individual drive system for the right hand driving wheel 12, in full right hand turn position. As previously set forth, right hand turn of the steering post effects forward movement of the right hand link 70, which causes forward movement of the lower end of the connected lever 73 about its pivot 72, whereby the lever stop 74 engages stop 75 and lifts the idler arm out of contact with the belt 54. This movement of the idler arm is opposed, of course, by the attached spring 64. At full right hand turn position, accordingly, no power is transmitted to the right hand driving wheel, and it is permitted to remain relatively stationary while the left hand driving wheel, as will hereinafter appear, is driven at an accelerated pace. At full turn position, then, an extremely sharp turn is effected, of a radius equal substantially to the tread of the driving wheel pair.

In turning the steering post slightly toward the right, the displacement of the right hand link 70 and lever 73 is in the same direction, but of lesser extent, so as to slightly decrease the pressure exerted upon belt 54 through idler 62 by means of the spring 64, whereby the power transmitted to the right hand pulley 55 will be slightly diminished. Simultaneously, as will be readily understood, the left hand link 70 and lever 73 are moved rearwardly a corresponding amount, permitting the left hand spring 64 to pull the connected idler 62 downwardly, whereby correspondingly greater pressure is exerted on the left hand belt 54 and a greater proportion of power is transmitted to the left hand pulley 55 and the left hand driving wheel 12. In this manner the drive system functions upon a slight turn of the steering post in either direction to diminish the power transmission to the wheel inside the turn, and correspondingly increases the power transmission to the wheel outside the turn, whereby an exceedingly smooth turn is effected without diminution of forward speed. Further, the differential power transmission to the individual driving wheels is automatically and finely controlled, and varies with the degree of turn given the steering post, until a final position corresponding to full turn is reached, at which point the driving wheel inside the turn receives no power and the driving wheel outside the turn receives full power of the power shaft 34.

The full left turn position of the drive system for the right hand driving wheel is illustrated in Figure 8, wherein it will be seen that link 70 and lever 73 have been moved rearwardly by control member 68 sufficiently to permit idler 62 to bear against belt 54 under the full pressure of spring 64, whereby pulley 55 is driven from pulley 53 with no belt slippage. Further rearward movement of link 70 and lever 73 from the position shown will effect merely rotation of lever 73 about pivot 72, and ensuing separation of stops 74 and 75.

To permit disconnection of both driving wheels while the cutter-knife assembly is still rotated, the rock shaft 76 is provided which may be turned by means of the exterior handle 77, thereby lifting both arms 78, and by means of chains 79 depending from the arms lifting both idler arms 63 out of operative engagement with the belts 54 therebelow, against the action of springs 64. As in the case of handle 43, stop means for handle 77 may be provided to maintain the idler arms in disengaged position. Disconnection of the driving wheels in this manner permits manual manipulation of the device, whereby the mower may be pushed rearwardly into corners, under bushes, and to other points not conveniently reached by forward movement. The disengaged position of arm 78, chain 79 and idler arm 63 is indicated in dotted lines in Figure 6.

From the foregoing, it will be evident that by the present invention there is provided a novel and highly useful drive system, permitting exceedingly fine, even and steady control of power transmission to individual driving wheels, in accordance with the direction and degree of rotative movement of a steering member. The drive system is particularly useful in rotary mowers and similar self-propelled vehicles, permitting a smooth flow of power to individual driving wheels at all times, in accordance with the requirements of vehicle direction, especially when operating on wet or otherwise slippery terrain. The exemplary embodiment illustrated herein is capable of turning without diminution of forward speed, and capable also of extremely sharp turns. The driving wheels being located outward of the cutter-knife assembly, the device is constructed with relatively wide tread and possesses correspondingly great stability.

The mower and its operator are propelled in normal operation solely by the engine 35, and the tow bar 26 is not utilized at all. The tow bar is provided, however, as readily available means for transportation of the mower from place to place in trail of another vehicle.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. A vehicle drive system including a frame, a transversely disposed power shaft mounted on said frame, transversely spaced drive wheels mounted on said frame, individual belts operatively engaged to said power shaft for transmitting power to each of said drive wheels, an idler pivotally mounted on said frame in cooperative relationship to each of said belts, a steering post mounted on said frame, a cable, guide members mounted on said frame for supporting said cable for axial movement, the ends of said cable being fixed to transversely spaced points on said steering post, a T member mounted at its intersection on said frame for pivotal movement in a horizontal plane, the foot of said T being fixed to an intermediate portion of said cable, and means connecting the cross piece ends of said T to said idlers so that pivotal movement of said T effects differential movement of said idlers.

2. A vehicle drive system as defined in claim 1, including means for simultaneously moving both of said idlers out of operative engagement with said belts.

3. A drive system for small self-propelled vehicles including a frame, a source of motive power mounted on said frame, a transversely disposed power shaft mounted on said frame, driving means connecting said source of motive power to said power shaft, transversely spaced drive wheels mounted on said frame, individual belts operatively engaged to said power shaft for transmitting power to each of said drive wheels, an idler pivotally mounted on said frame in cooperative relationship to each of said belts, a steering post mounted on said frame, a cable, guide members mounted on said frame for supporting said cable for axial movement, the ends of said cable being fixed to transversely spaced points on said steering post, a T member mounted at its intersection on said frame for pivotal movement in a horizontal plane, the foot of said T being fixed to an intermediate portion of said cable, and means connecting the cross piece ends of said T to said idlers so that pivotal movement of said T effects differential movement of said idlers.

ROBERT E. CHURCH.

References Cited in the file of this patent

UNITED STATES PATENTS

| Number | Name | Date |
|---|---|---|
| 1,589,393 | Howe | June 22, 1926 |
| 1,691,020 | Briton | Nov. 6, 1928 |
| 1,821,073 | Paul | Sept. 1, 1931 |
| 2,191,961 | Howell | Feb. 27, 1940 |
| 2,192,468 | Gore | Mar. 5, 1940 |
| 2,329,372 | Hitch | Sept. 14, 1943 |
| 2,453,417 | Dufour | Nov. 9, 1948 |
| 2,461,391 | Osterhaus | Feb. 8, 1949 |
| 2,475,671 | McCartney | July 12, 1949 |
| 2,483,599 | Spitzer | Oct. 4, 1949 |
| 2,494,271 | Turner | Jan. 10, 1950 |
| 2,572,202 | Rowland | Oct. 23, 1951 |

FOREIGN PATENTS

| Number | Country | Date |
|---|---|---|
| 22,738 | Great Britain | Oct. 9, 1897 |
| 598,832 | France | Oct. 6, 1925 |